US012789508B2

(12) United States Patent
Boote et al.

(10) Patent No.: US 12,789,508 B2

(45) Date of Patent: Nov. 10, 2026

(54) GLAZING HAVING A DATA TRANSMISSION WINDOW, METHOD OF MANUFACTURING THE SAME AND USE OF THE SAME

(71) Applicant: Pilkington Group Limited, Nr. Ormskirk (GB)

(72) Inventors: Joseph Jeremy Boote, Ormskirk (GB); Alastair French, Liverpool (GB)

(73) Assignee: Pilkington Group Limited, Nr. Ormskirk Lancashire (GB)

( * ) Notice: Subject to any disclaimer, the term of this patent is extended or adjusted under 35 U.S.C. 154(b) by 1059 days.

(21) Appl. No.: 17/775,324

(22) PCT Filed: Nov. 13, 2020

(86) PCT No.: PCT/GB2020/052891

§ 371 (c)(1),
(2) Date: May 9, 2022

(87) PCT Pub. No.: WO2021/094767

PCT Pub. Date: May 20, 2021

(65) Prior Publication Data

US 2022/0388901 A1 Dec. 8, 2022

(30) Foreign Application Priority Data

Nov. 13, 2019 (GB) ...................................... 1916522

(51) Int. Cl.
*B32B 17/10* (2006.01)
*B32B 17/06* (2006.01)

(52) U.S. Cl.
CPC .......... *B32B 17/1022* (2013.01); *B32B 17/06* (2013.01); *B32B 17/10348* (2013.01);
(Continued)

(58) Field of Classification Search
CPC ................ B32B 17/1022; B32B 17/06; B32B 17/10348; B32B 2311/00; B32B 2311/08; B32B 2311/12
(Continued)

(56) References Cited

U.S. PATENT DOCUMENTS 6,891,517 B2 5/2005 Voeltzel
7,880,120 B2 * 2/2011 Schmidt ............ B32B 17/10183 52/171.2

(Continued)

FOREIGN PATENT DOCUMENTS

JP 2013513538 A 4/2013
JP 2016508108 A 3/2016

(Continued)

OTHER PUBLICATIONS

International Search Report (PCT/ISA/210) and Written Opinion (PCT/ISA/237) mailed on Feb. 4, 2021, by the European Patent Office as the International Searching Authority for International Application No. PCT/GB2020/052891. (9 pages).

(Continued)

*Primary Examiner* — Betelhem Shewareged
(74) *Attorney, Agent, or Firm* — BUCHANAN INGERSOLL & ROONEY PC

(57) ABSTRACT

A glazing includes a first glass sheet, a resistive coating extending across a part of the first glass sheet, first and second busbars connected to the resistive coating, a data transmission window in the resistive coating, comprising a plurality of deletion lines in the resistive coating, a plurality of channels, formed by the plurality of deletion lines, and at least one conductive element positioned in at least one of the channels. The conductive element is separated from the first and second busbars by the resistive coating.

20 Claims, 3 Drawing Sheets

(52) U.S. Cl.
CPC ....... *B32B 2311/00* (2013.01); *B32B 2311/08* (2013.01); *B32B 2311/12* (2013.01)

(58) Field of Classification Search
USPC .......................................................... 428/209
See application file for complete search history.

(56) References Cited

U.S. PATENT DOCUMENTS

| | | | | |
|---|---|---|---|---|
| 10,062,952 | B2 | 8/2018 | Dai et al. | |
| 2004/0107641 | A1 | 6/2004 | Walton et al. | |
| 2004/0200821 | A1 | 10/2004 | Voeltzel | |
| 2007/0045264 | A1 | 3/2007 | Nekoda et al. | |
| 2012/0193341 | A1 | 8/2012 | Reul et al. | |
| 2015/0319808 | A1 | 11/2015 | Kagaya et al. | |
| 2015/0351160 | A1* | 12/2015 | Phan | B32B 17/10761 219/203 |
| 2016/0374150 | A1 | 12/2016 | Guillaume et al. | |
| 2017/0251525 | A1* | 8/2017 | Chamberlain | H05B 3/84 |
| 2019/0141792 | A1 | 5/2019 | Phan et al. | |
| 2022/0388901 | A1* | 12/2022 | Boote | C03C 8/18 |

FOREIGN PATENT DOCUMENTS

| | | | | |
|---|---|---|---|---|
| JP | 2017506839 | A | 3/2017 | |
| JP | 2018058375 | A | 4/2018 | |
| JP | 2019523747 | A | 8/2019 | |
| WO | 2005105691 | A1 | 11/2005 | |
| WO | 2013130137 | A1 | 9/2013 | |
| WO | 2015071673 | A1 | 5/2015 | |
| WO | WO-2016038376 | A1 * | 3/2016 | H05B 3/84 |
| WO | 2017216583 | A1 | 12/2017 | |

OTHER PUBLICATIONS

Patents Act 1977:Search Report under Section 17 mailed on Apr. 21, 2020 by the Intellectual Property Office in corresponding Great Britain Patent Application No. 1916522.4. (4 pages).

* cited by examiner

GLAZING HAVING A DATA TRANSMISSION WINDOW, METHOD OF MANUFACTURING THE SAME AND USE OF THE SAME

FIELD OF THE INVENTION

The invention concerns a glazing having a data transmission window, a method of manufacturing said glazing and use of said glazing.

Data transmission windows in a glazing are regions where a conductive coating has at least one interruption, for example made by laser deletion, to allow an electronic device to communicate data via electromagnetic radiation through it. If the conductive coating is used for resistive heating, then the interruption affects heat distribution across the glazing.

BACKGROUND OF THE INVENTION

U.S. Pat. No. 7,880,120B2 (Schmidt) discloses a window pane provided with a resistive heating coating connected to two conductor rails. Conductive strands, contacting at least one conductor rail, straddle an interruption in the coating, called a communication window. Risks of forming hot spots around lateral edges of said communication window are reduced.

WO2015071673A1 (Paulus) discloses a glazing having an electrically conductive coating and a data transmission window (DTW) therein, comprising a plurality of ablations in the electrically conductive coating arranged to form a plurality of grids. A distance between adjacent grids is adjusted to maximise transmission of a predetermined frequency of electromagnetic radiation.

U.S. Ser. No. 10/062,952B2 (Dai) discloses a heatable window having a heatable coating and an area of the coating with a Frequency Selective Surface (FSS), also called a communication window. An FSS comprises at least an area in which a set of vertical slots crosses a set of horizontal slots to form a patch array. Patch arrays are spaced from each other by strips of undeleted coating to enable electric current flow to heat the communication window.

There remains a need for an alternative glazing having a DTW comprising a plurality of channels of undeleted coating for heating the DTW, providing in use a predetermined heat distribution across the glazing.

SUMMARY OF THE INVENTION

The present invention accordingly provides, in a first aspect, a glazing comprising:

a first glass sheet;

a resistive coating extending across a part of the first glass sheet;

first and second busbars connected to the resistive coating;

a data transmission window in the resistive coating, comprising:

a plurality of deletion lines in the resistive coating;

a plurality of channels formed by the plurality of deletion lines; and at least one conductive element positioned in at least one of the channels;

wherein the at least one conductive element is separated from the first and second busbars by the resistive coating.

The inventors have found that positioning a conductive element in a channel for electric current and separating the conductive element from the busbars by the resistive coating is advantageous to provide useful heat distribution across the glazing. The invention reduces temperatures of unwanted hot spots, increases temperatures of unwanted cold spots and provides faster defogging or defrosting of the glazing in predetermined regions.

Surprisingly, temperature in a channel having such a conductive element increases, compared with the same channel without the conductive element, and has minimal effect on RF transmission through the data transmission window, unlike the prior art.

The invention overcomes a technical prejudice found in the prior art (e.g. U.S. Pat. No. 7,880,120B2) that conductive elements should directly contact at least one busbar.

The resistive coating may be deposited on the first glass sheet.

The resistive coating may comprise at least one layer of silver.

The resistive coating may have sheet resistance in a range 0.3 to 20.0 ohms/square.

The data transmission window may comprise at least three channels.

The data transmission window may be configured to allow transmission of data in a predetermined frequency band.

The conductive element may be a line.

The conductive element may comprise a tip shaped as a cross, tee, circle, triangle or polygon.

The conductive element may comprise silver, copper or tungsten.

The conductive element may be printed using a screen-printing paste comprising frit and at least 80% silver.

Preferably the conductive element has a width in a range 5 μm to 5 mm.

Preferably conductive elements are positioned in each of at least three channels, more preferably at least six channels, most preferably in at least nine channels. At least one conductive element may be positioned in a predetermined selection of channels, preferably in channels at left and right sides of the data transmission window, more preferably in channels at the centre of the data transmission window.

A glazing according to the invention may further comprise an obscuration band positioned around a periphery of the glazing.

Preferably the obscuration band at least partly covers the data transmission window. Advantageously the obscuration band at least partly covers the conductive elements so that parts of the conductive elements not covered by the obscuration band have less effect on visibility through the glazing.

The present invention provides, in a second aspect, a method of manufacturing a glazing comprising steps:

providing a first glass sheet;

depositing a resistive coating extending across a part of the first glass sheet;

providing first and second busbars connected to the resistive coating;

configuring a data transmission window in the resistive coating, comprising steps of:

providing a plurality of laser deletion lines in the resistive coating;

forming a plurality of channels by the plurality of deletion lines;

positioning at least one conductive element in at least one of the channels;

configuring the at least one conductive element to be separated from the first and second busbars by the resistive coating.

The inventors have found that configuring the conductive element to be separated from the busbars by the resistive coating is a simple method of manufacturing a glazing having a useful heat distribution.

The conductive element may be a wire comprising copper or tungsten embedded in a ply of interlayer material.

The conductive element may be digitally printed using an inkjet printer.

The conductive element may be printed by screen printing. Preferably first and second busbars are printed by screen-printing. Advantageously, the conductive element and the busbars are printed by screen-printing at the same time, thus combining two process steps into one.

The present invention provides, in a third aspect, use of a glazing according to claim 1 as a window for a building or a window for a vehicle including a vehicle windscreen, a vehicle rear window, a vehicle side window or a vehicle roof window.

The inventors have found that use of a glazing according to the invention as a window for a building or a window for a vehicle is highly advantageous because positioning the conductive element to be separated from the busbars by the resistive coating provides a technical effect of faster defogging, or defrosting, with minimal effect on RF transmission through the data transmission window.

BRIEF DESCRIPTION OF THE DRAWINGS

The present invention will now be described by way of example only and with reference to the accompanying drawings, in which like reference numbers identify like parts.

DETAILED DESCRIPTION

Figure 1:
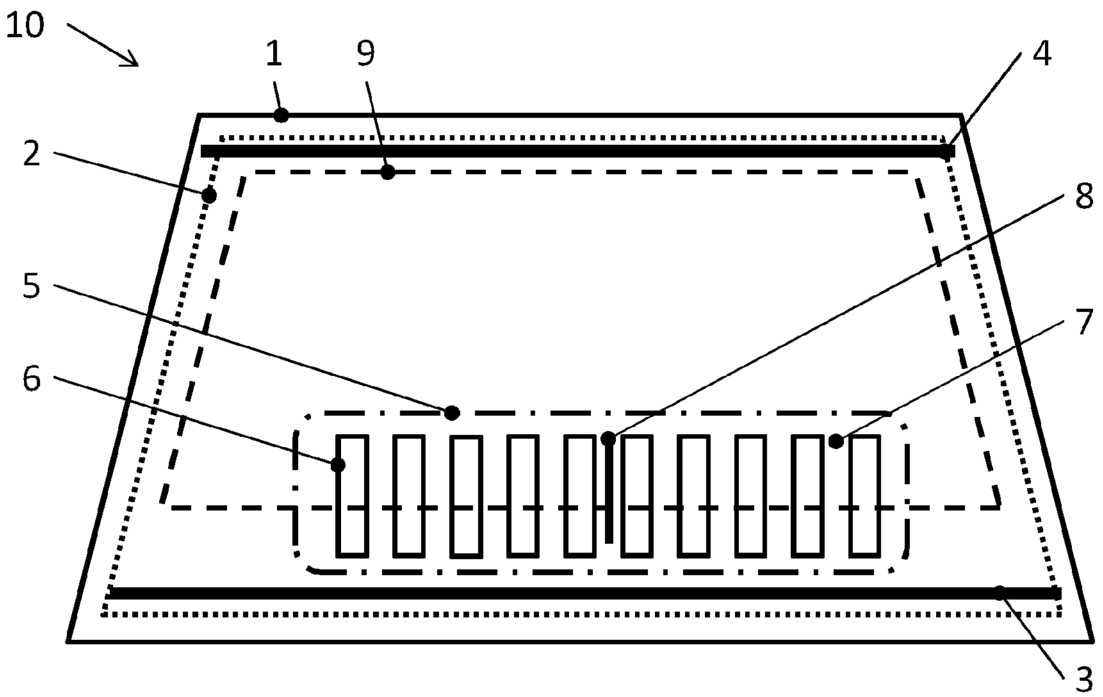
FIG. 1 is a plan view of a glazing according to the invention, the glazing having one conductive element.

Referring to FIG. 1, a glazing (10) comprises a glass sheet (1). The glass sheet (1) may be soda-lime-silica glass formed by the float process, and have thickness in a range 0.5 mm to 25 mm, or 0.5 to 3 mm, more preferably 1.0 to 2.1 mm. The glass sheet (1) may be annealed, heat strengthened, or tempered.

The glazing (10) may further comprise a second glass sheet and a ply of interlayer material between the first glass sheet (1) and the second glass sheet to form a laminated glass. First and second glass sheets may be of the same composition. The ply of interlayer material may be polyvinyl butyral (PVB) and have thickness 0.76 mm. The laminated glass may have thickness in a range 4.3 to 5.1 mm.

A resistive coating (2) extends across a part of the first glass sheet (1), preferably not in a periphery of the first glass sheet (1). The resistive coating (2) may be deposited on the first glass sheet (1), the second glass sheet or the ply of interlayer material.

The resistive coating (2) may comprise one, two or three layers of silver. Preferably layers of silver are separated by layers of dielectric material. The resistive coating (2) may comprise a layer of transparent conductive oxide such as fluorine doped tin oxide.

The resistive coating (2) has sheet resistance in a range 0.3 to 20.0 ohms/square, preferably 0.5 to 12.0 ohms/square, more preferably 1.0 to 4.0 ohms/square.

First and second busbars (3, 4) are connected to the resistive coating (2) and may be printed using a screen-printing paste comprising glass frit and at least 80%, 85% or 100% silver.

A data transmission window (5) is configured in the resistive coating (2), comprising a plurality of deletion lines (6) in the resistive coating (2) and a plurality of channels (7) formed by the plurality of deletion lines (6).

The data transmission window (5) preferably has at least three channels (7), more preferably at least six channels (7), most preferably at least nine channels (7). Channel width may be 1 to 10 mm, preferably 3 to 5 mm.

Deletion lines (6) typically have width 0.1 mm to 0.3 mm. At least two channels (7) for electric current are formed by the deletion lines (6).

The data transmission window (5) is configured to allow transmission of data in a predetermined frequency band. Preferably the frequency band is 1 MHz to 20 GHz, more preferably 1 GHz to 18 GHz, more preferably 2 GHz to 12 GHz, more preferably 3.5 GHz to 11.5 GHz, more preferably 4 GHz to 8.5 GHz, most preferably 2.5 GHz to 5.8 GHz. Advantageously the frequency band is selected for Electronic Toll Collection (ETC).

A conductive element (8) is positioned in at least one of the channels (7), is shaped as a line, or a finger having a long, narrow shape, such as a rectangle and may have a tip (C) optionally shaped as a cross, tee, circle, triangle or polygon. Advantageously, tip (C) is shaped unlike the finger to allow different paths for electric current and so avoids hot spots.

The conductive element (8) may be printed using a screen-printing paste comprising frit and at least 80%, 85% or 100% silver, or may comprise copper, tungsten, or any other suitable conductor and be applied as a wire or a metal strip or screen printed.

The conductive element (8) width may be in a range 5 μm to 5 mm, preferably 20 μm to 3 mm, more preferably 0.3 mm to 1 mm.

An obscuration band (9) is positioned around a periphery of the glazing (10) and at least partly covers the data transmission window (5). Advantageously the obscuration band at least partly covers the conductive element (8) so that it is less visible.

Figure 2:
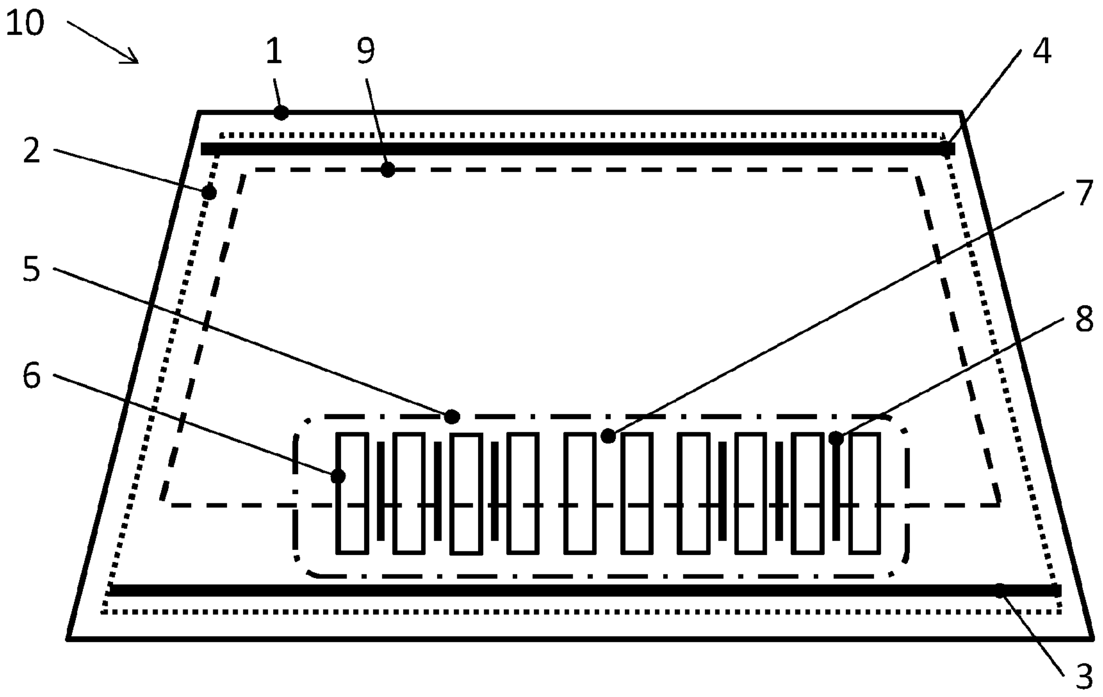
FIG. 2 is a plan view of a glazing according to the invention, the glazing having six conductive elements.

In FIG. 2, a plurality of conductive elements (8) are positioned in six channels (7), at left and right sides of the data transmission window (5), three at each side.

Figure 3:
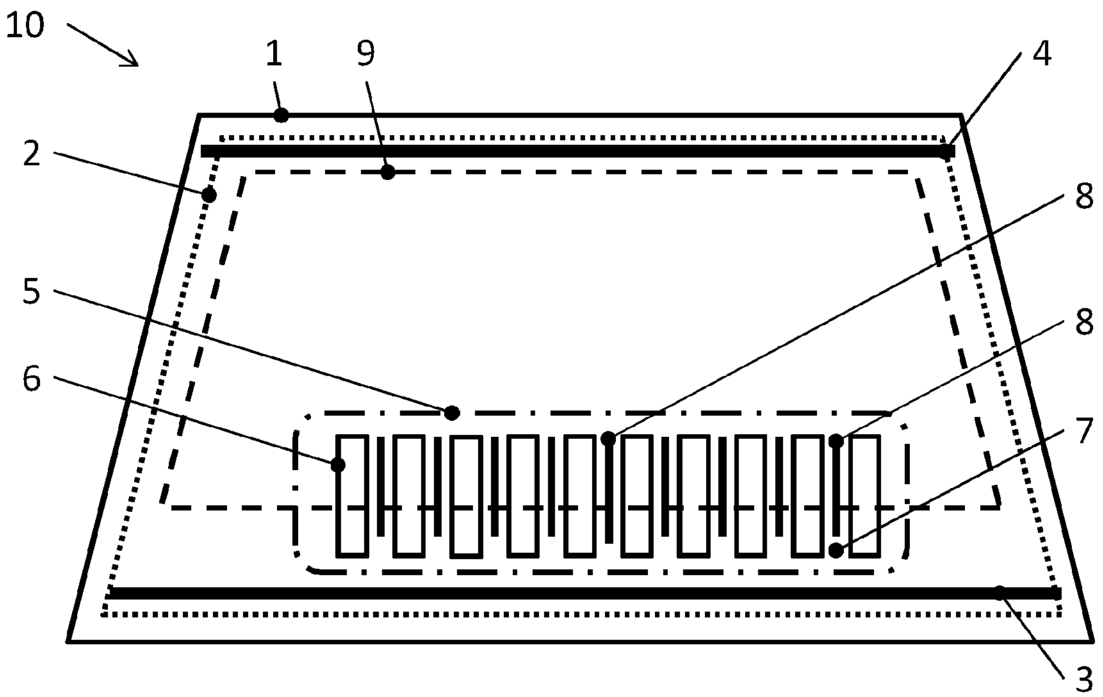
FIG. 3 is a plan view of a glazing according to the invention, the glazing having nine conductive elements.

In FIG. 3, conductive elements (8) are in nine channels (7), so that more electric current flows through the data transmission window (5) than in FIG. 2.

Figure 4:
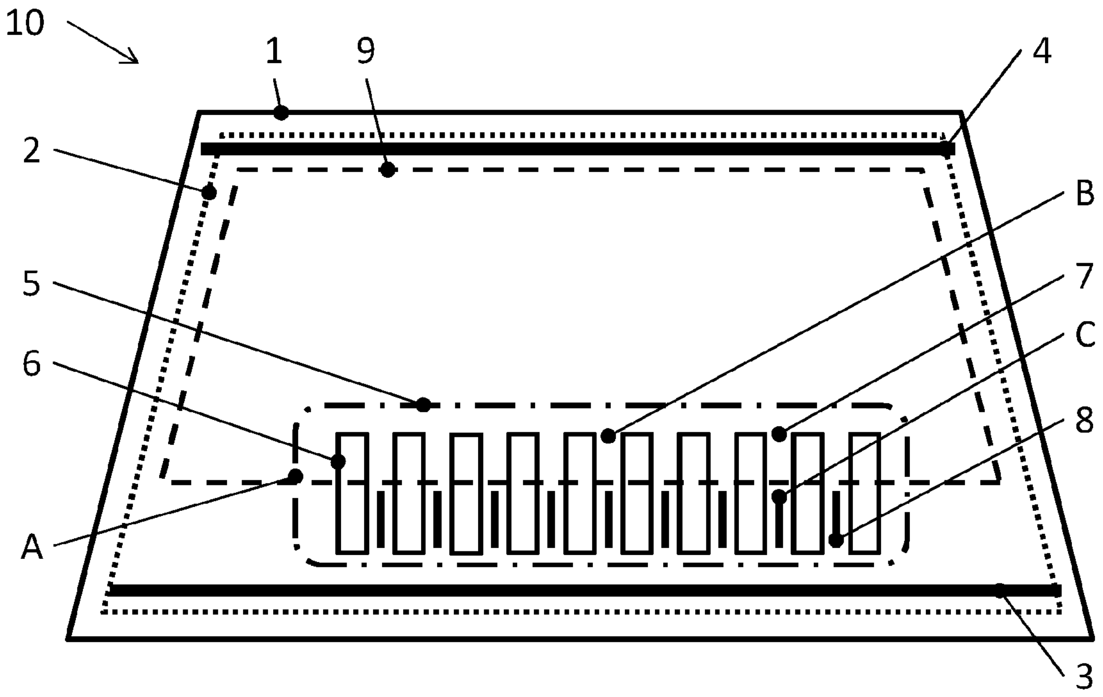
FIG. 4 is a plan view of a glazing according to the invention, the glazing having nine conductive elements and an obscuration band covering conductive elements.

In FIG. 4, conductive elements (8) are completely covered by the obscuration band (9) so visibility through the glazing is better than in FIG. 3.

Figure 5:
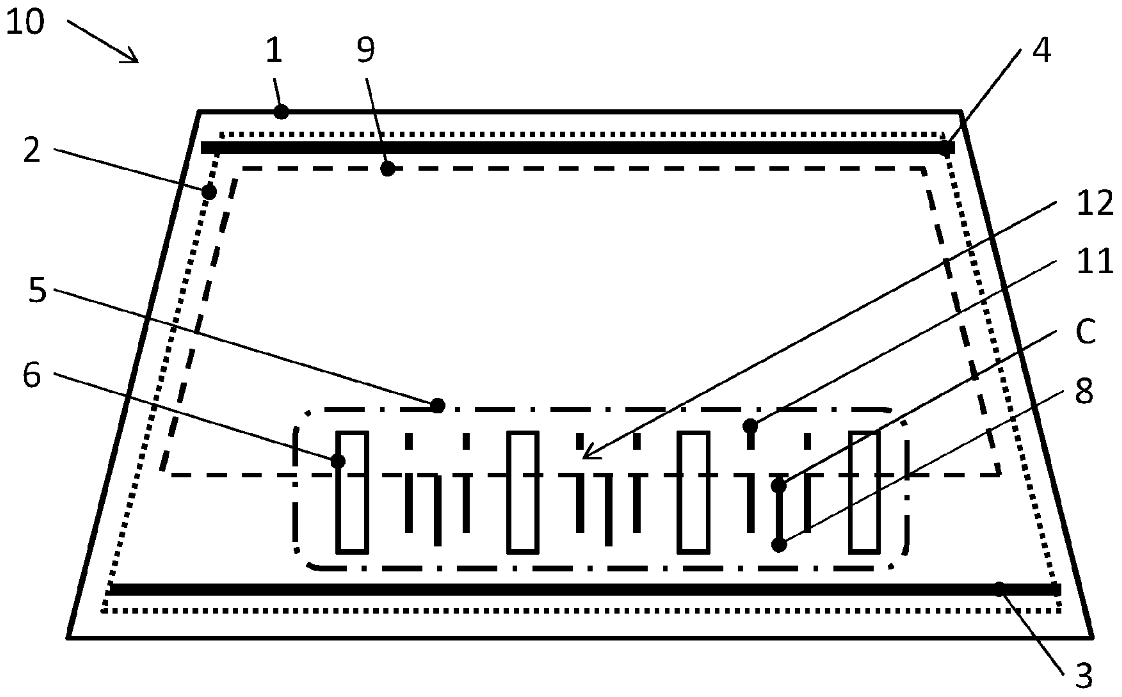
FIG. 5 is a plan view of a glazing according to the invention, the glazing having three conductive elements in three channels having break lines and gaps.

In FIG. 5 three conductive elements (8) are positioned in three channels (7). Each channel (7) has two break lines (11). As disclosed in WO2015071673A1, where deletion lines (6) are configured as grids, one or more break lines (11) between adjacent grids can maintain RF performance for horizontally polarised waves. Horizontal electric currents are blocked by the break lines (11), aligned vertically. A channel (7) having break lines (11) can be wider, allowing more vertical electric current to flow in the data transmission window (5). A break line is preferably formed by laser deletion, in the same way as the deletion lines (6).

Vertical break lines (11) limit horizontal flow electric current flow not only for RF but also for heating. Hot spots may result from the introduction of break lines (11) having a conductive element (8) between them. To solve this problem the tip (C) may extend across a break line (11) shaped as an elongated tee. Advantageously, electric current flows though the elongated tip (C) so that more of the channel (7) is available for current flow from the conductive element (8), thus reducing temperature of hot spots.

Conductive elements (8) may have length shorter than adjacent break lines (11), for example to be hidden by the obscuration band (9). At least one gap (12) in the break line (11) may be provided above or below the tip (C). Advantageously, electric current flows though the gap (12) so that more of the channel (7) is available for current flow from the conductive element (8), thus reducing temperature of hot spots.

EXAMPLES

The following is a description of examples of the present invention. The present invention is not limited to the examples described below.

Table 1 shows temperature measurements related to four examples of the invention and one comparative example, generally as shown in FIG. 4.

In all five cases:

Data transmission window (5) has nine channels (7) each of width 6 mm

Resistive coating (2) has sheet resistance 10 ohms/square

For the four examples, conductive elements (8) each have length 49 mm.

Example 1 has six conductive elements (8), three at each side as in FIG. 2, but configured to be covered by the obscuration band as in FIG. 4. The conductive elements (8) are not in direct contact with the busbars (3, 4) and are in the shape of lines, comprising 100% silver, width 1 mm.

Example 2 is like Example 1 but with nine conductive elements (8), one positioned in each of the nine channels (7) as in FIG. 4.

Example 3 is like Example 2 but with copper wires having diameter 100 μm.

Example 4 is like Example 3 but with tungsten wires having diameter 25 μm.

The comparative example lacks conductive elements (8) in the channels (7).

Heating was simulated for 12 minutes at 42 volts and temperature measurements were made at three locations in the data transmission window (5):

A: Side (left side in FIG. 4), a typical hot spot

B: Top (centre in FIG. 4) a typical cold spot

C: Tip of conductive element (8), second from side (right side in FIG. 4)

TABLE 1

| | Conductive Element (8) | | Temperature (° C.) | | |
|---|---|---|---|---|---|
| Example Number | Quantity | Material | Side (A) | Top (B) | Tip (C) |
| Example 1 | 6 | Silver | 59.5 | 22.3 | 39.8 |
| Example 2 | 9 | Silver | 57.6 | 25.6 | 38.2 |
| Example 3 | 9 | Copper | 57.6 | 25.5 | 37.8 |
| Example 4 | 9 | Tungsten | 58.4 | 25.1 | 35.9 |
| Comparative example | | | 63.4 | 22.0 | 26.6 |

Temperature at the tip (C) of the conductive element (8) was highest in Example 1. Temperature at centre and top (B) of the data transmission window (5) was highest in Example 2. Surprisingly the invention provides a predetermined temperature distribution by concentrating current flow in a predetermined quantity of channels (7) according to need.

Temperature at the side (A) in Example 2 (silver) and in Example 3 (copper) was the same. Advantageously, copper may be used instead of silver to achieve the same reduced temperature of a hot spot at the side (A) at lower material cost.

Temperature at the side (A) in Example 4 (tungsten) is less than in Example 1 (silver). Advantageously, tungsten wires having diameter 25 μm can be used instead of silver lines having width 1 mm, to reduce hot spot temperature and to be less visible.

The comparative example has coldest cold spots at top (B) and tip (C) and hottest hot spot (A), because it lacks conductive elements (8) separated from the busbars (3, 4) by the resistive coating (2). In use as a vehicle windscreen, Examples 1 to 4 would have better performance for defogging or defrosting compared with the comparative example.

KEY TO THE DRAWINGS

Reference numerals in the drawings are as follows:

1: glass sheet
2: resistive coating
3: first busbar
4: second busbar
5: data transmission window
6: deletion lines in the resistive coating
7: channels for electric current
8: conductive element
9: obscuration band
10: glazing
11: break line in the channel
12: gap in the break line
A: Hot spot at side of data transmission window
B: Cold spot at top of data transmission window
C: Tip of conductive element

The invention claimed is:

1. A glazing comprising:

a first glass sheet;

a resistive coating extending across a part of the first glass sheet;

first and second busbars connected to the resistive coating;

a data transmission window in the resistive coating, consisting of:

a plurality of deletion lines in the resistive coating, each of the plurality of deletion lines having a width in a range of greater than 0.1 mm and less than or equal to 0.3 mm;

a plurality of channels, formed by the plurality of deletion lines and separated solely by the plurality of deletion lines; and at least one conductive element positioned in at least one of the channels;

wherein the at least one conductive element is separated from the first and second busbars by the resistive coating, wherein the data transmission window is configured to allow transmission of data in a predetermined frequency band of 1 MHz to 20 GHz.

2. A glazing according to claim 1, wherein the resistive coating is deposited on the first glass sheet.

3. A glazing according to claim 1, wherein the resistive coating comprises at least one layer of silver.

4. A glazing according to claim 1, wherein the resistive coating has sheet resistance in a range 0.3 to 20.0 ohms/square.

5. A glazing according to claim 1, wherein the data transmission window comprises at least three channels.

6. A glazing according to claim 1, wherein the conductive element is a line.

7. A glazing according to claim 1, wherein the conductive element comprises a tip shaped as a cross, tee, circle, triangle or polygon.

8. A glazing according to claim 1, wherein the conductive element comprises silver, copper or tungsten.

9. A glazing according to claim 1, wherein the conductive element is printed using a screen-printing paste comprising frit and at least 80% silver.

10. A glazing according to claim 1, wherein the conductive element width is in a range 5 μm to 5 mm.

11. A glazing according to claim 1, wherein conductive elements are positioned in each of at least three channels.

12. A glazing according to claim 1, wherein at least one channel comprises at least two break lines.

13. A glazing according to claim 12, wherein at least one break line comprises at least one gap above or below the tip.

14. A glazing according to claim 1, further comprising an obscuration band positioned around a periphery of the glazing.

15. A method of manufacturing a glazing comprising:

providing a first glass sheet;

depositing a resistive coating extending across a part of the first glass sheet;

providing first and second busbars connected to the resistive coating;

configuring a data transmission window in the resistive coating, consisting of:

a plurality of laser deletion lines in the resistive coating, each of the plurality of deletion lines having a width in a range of 0.1 to 0.3 mm;

a plurality of channels, formed by the plurality of deletion lines and separated solely by the plurality of deletion lines; and at least one conductive element provided in at least one of the channels;

wherein the at least one conductive element is separated from the first and second busbars by the resistive coating, wherein the data transmission window is configured to allow transmission of data in a predetermined frequency band of 1 MHz to 20 GHz.

16. A method according to claim 15, wherein the conductive element is wire comprising copper or tungsten embedded in a ply of interlayer material.

17. A method according to claim 15, wherein the conductive element is digitally printed using an inkjet printer.

18. A method according to claim 15, wherein the conductive element is printed by screen printing.

19. A method according to claim 18, wherein first and second busbars are printed by screen printing at the same time as the conductive element.

20. Use of glazing according to claim 1, as a window for a building or a window for a vehicle.

* * * * *